(12) United States Patent
Reichmann et al.

(10) Patent No.: US 8,223,446 B2
(45) Date of Patent: Jul. 17, 2012

(54) DEVICE FOR TEMPERATURE-DEPENDENT AXIAL MOVEMENT OF OPTICAL COMPONENTS

(75) Inventors: Lutz Reichmann, Jena (DE); Tobias Seeland, Ilmenau (DE)

(73) Assignee: JENOPTIK Optical Systems GmbH, Jena (DE)

( * ) Notice: Subject to any disclaimer, the term of this patent is extended or adjusted under 35 U.S.C. 154(b) by 124 days.

(21) Appl. No.: 12/888,611

(22) Filed: Sep. 23, 2010

(65) Prior Publication Data
US 2011/0075279 A1 Mar. 31, 2011

(30) Foreign Application Priority Data
Sep. 25, 2009 (DE) .......................... 10 2009 043 161

(51) Int. Cl.
*G02B 7/02* (2006.01)
(52) U.S. Cl. ........................................ 359/820; 359/819
(58) Field of Classification Search ........... 359/811–823
See application file for complete search history.

(56) References Cited

U.S. PATENT DOCUMENTS

| | | | |
|---|---|---|---|
| 4,162,120 A | 7/1979 | Moreno | |
| 5,270,869 A | 12/1993 | O'Brien et al. | |
| 5,313,333 A * | 5/1994 | O'Brien et al. | 359/820 |
| 5,557,474 A * | 9/1996 | McCrary | 359/820 |
| 6,574,055 B1 * | 6/2003 | Stallard | 359/820 |
| 7,072,126 B2 * | 7/2006 | Goral et al. | 359/820 |
| 2005/0069376 A1 | 3/2005 | Blanding | |
| 2007/0097529 A1 | 5/2007 | Weber et al. | |
| 2010/0073786 A1 | 3/2010 | Bornschein et al. | |

FOREIGN PATENT DOCUMENTS

| | | |
|---|---|---|
| DE | 10 2007 014 155 A1 | 9/2008 |
| DE | 10 2006 046 416 B4 | 3/2009 |
| EP | 0 564 376 A1 | 10/1993 |
| EP | 0 604 328 A1 | 6/1994 |
| EP | 1 586 927 A1 | 10/2005 |
| JP | 57 208516 A | 12/1982 |
| JP | 58 203405 A | 11/1983 |

* cited by examiner

*Primary Examiner* — Mohammed Hasan
(74) *Attorney, Agent, or Firm* — Leydig, Voit & Mayer, Ltd.

(57) ABSTRACT

A device for the temperature-dependent axial movement of an optical component including a monolithic mounting unit having an outer mounting part forming a fixed holder having an axis and an inner mounting part forming a mount adapted to support the optical component. The mount is movable along the axis. A moving mechanism is connected to the fixed holder and the movable mount. The moving mechanism includes at least one external expansion element including a first material having a first coefficient of thermal expansion and at least one internal expansion element including a second material having a second coefficient of thermal expansion, where the first coefficient of thermal expansion is larger than the second coefficient of thermal expansion. A number of connecting links is disposed in a star-shaped formation and join a respective one of the at least one external expansion element to a respective one of the internal expansion element. Each connecting link is disposed at a prescribed pitch angle with respect to the axis that differs from 90°.

15 Claims, 4 Drawing Sheets

DEVICE FOR TEMPERATURE-DEPENDENT AXIAL MOVEMENT OF OPTICAL COMPONENTS

CROSS REFERENCE TO RELATED APPLICATIONS

This application claims priority from German Patent Application No. DE 10 2009 043 161.6, filed on Sep. 25, 2009, which is incorporated by reference herein in its entirety.

FIELD

The invention relates to a device in which, inside a fixed holder, a mounted optical component such as a lens or a lens group is axially moved as a function of the temperature.

BACKGROUND

Optically imaging systems are temperature-dependent. Due to the effect of the temperature, not only the geometry but also the refractive index of the material of optical components changes. Especially in the case of lenses, whose thickness, radius and refractive index are decisive for the imaging, temperature fluctuations can considerably influence the imaging quality. Moreover, an optical system is also affected by the thermal expansion of the mounting parts that hold the optical components together.

In this context, various approaches are known that compensate for the effect of the temperature on optical components and on the optical systems made up of such components.

One approach is to specifically make the individual optical components and the mounting parts out of materials that have different coefficients of expansion and to then combine these materials with each other in such a way that their coefficients of expansion act in opposite ways. In particular, there are modules of this type including several lenses. This type of temperature compensation is restricted to only small temperature ranges.

Another approach is that changes in the imaging properties of an optical system, which are especially due to a change in the focal length, are compensated for in that the optical components that are especially relevant for this are moved within the optical system. U.S. Pat. No. 4,162,120 shows a device with a fixed holder and a lens group that is axially moved inside the fixed holder as a function of temperature.

For this purpose, there is fundamentally an outer mounting part joined to a housing of the optical system and an inner mounting part that supports the optical component, whereby the two mounting parts are arranged coaxially to each other and have a shared axis along which the optical component is moved.

Various technical solutions are used to effectuate the movement, and these differ primarily in terms of whether the movement is done actively or passively.

For an active movement, it is possible to employ temperature sensors to control actuators such as, for example, a motor with a rack and pinion drive, with a spindle drive or with a piezoelectric drive. With this approach, it is possible to achieve large actuating forces and long travel distances, although this means that a large installation space will be required. Moreover, such devices require a power supply, something that is not feasible for many optical systems.

German patent application DE 10 2006 046 416 B4 describes a device that implements a passive movement by means of a cylinder-piston arrangement.

The outer mounting part is configured here as a cylinder firmly affixed to the housing, while the inner mounting part that supports an optical component is in the form of a piston. The cylinder and the piston are sealed off with respect to each other and together, over a prescribed length, they enclose a chamber filled with a fluid. As a function of the temperature coefficient of the fluid and the length of the chamber, the piston is moved in the axial direction inside the cylinder when the temperature of the fluid changes. Thus, in order to effectuate a certain movement of the optical component as a function of the temperature change, a certain length has to be prescribed for the chamber as a function of the temperature coefficient of the fluid used.

A drawback of this solution is that the conversion ratio between the expansion of the fluid and the adjustment distance is only 1:1, and only with a chamber of great length and thus a construction of great length is a possible adjustment range achieved of the kind that is needed for wider temperature ranges. A reactive polymer system that is liquid in the uncured state and that has a gel-like to elastomeric consistency in the cured state may be employed as the fluid. Such a device is not suitable for optical systems that work with extreme ultraviolet (EUV) radiation since the use of organic substances is excluded in order to avoid contaminations.

U.S. Pat. No. 5,557,474 describes a device for passive thermal compensation in which two lenses are moved with respect to each other as a function of the temperature change in order to jointly compensate for a temperature-dependent change in the imaging.

In order to compensate for a temperature-dependent change in the focal position of a system consisting of two individual lenses, the distance between the two lenses should be moved along the optical axis by 0.007 inches (0.17 mm) per change of 30° C. in the temperature.

For this purpose, spacer rings which are made of materials having different coefficients of expansion and which have planar surfaces that are wedge-shaped with respect to each other are arranged alternatingly between the two lenses. Depending on whether the spacer rings with the wedge-shaped surfaces tapered towards the outside or the spacer rings with the wedge-shaped surfaces tapered towards the inside have the larger coefficient of expansion, the distance between the lenses is decreased or increased when the temperature rises.

The magnitude of the change results from the number of spacer rings, from their wedge angles and radii as well as from the difference of the temperature coefficients of the materials.

Since the radial extension of the spacer rings is proportional to their radius and since the radius should be selected so as to match that of the lenses, such a device is only suitable for large optical systems, that is to say, lenses having a large diameter. A rough calculation shows that, assuming that the wedge surfaces have an angle of 2×45°, in other words, that both sides of the ring are configured to be wedge-shaped, and assuming that the difference between the coefficients of expansion is $23 \times 10^{-6}$ K$^{-1}$, then a ring having a diameter of 236 mm is needed for the envisaged compensation effect. Since a wedge angle of 45° can be expected to cause friction that will impair the function, a plurality of such rings will be required in the case of the usual friction values. Fundamentally speaking, this solution entails the disadvantage that a stick-slip effect is unavoidable owing to dry friction, and this markedly impairs the reproducibility and can completely prevent the function in the case of very small temperature fluctuations.

European patent application EP 0 604 328 A1 describes an optical array that yields a collimated light beam of the same quality over a wide temperature range in that a thermal compensation means is arranged between the mount of the collimating optical component and the holder of the light source. The thermal compensation means can be a compensation ring, formed by a laminate of layers in which bundles of fibers are wound at different angles. This arrangement is not suitable for use in the EUV range since it normally requires the use of an organic matrix as the composite material, and this has to be fundamentally ruled out for applications in the EUV range in order to avoid contaminations.

U.S. Pat. No. 4,162,120 likewise describes a thermal compensation device that effectuates a linear movement in response to temperature changes and that can be employed in optical systems.

In comparison to the state of the art described here, it should also be possible to compensate for large temperature changes in that a link assembly is constructed from a plurality of elongated links of two types having dissimilar coefficients of thermal expansion.

The first type of link is made of a material having a relatively high coefficient of thermal expansion such as aluminum or magnesium, while the second type of link is made of a material having a relatively low coefficient of thermal expansion such as Kovar or Invar.

The links are arranged alternately and joined to each other at their ends in order to form a folded link assembly. For the sake of clarity, one link with a low coefficient of expansion joined to one link with a high coefficient of expansion should be understood as a link pair.

For use in an optical system, for example, three such link assemblies—each consisting of a prescribed, equal number of link pairs—are mounted with one end on a fixed holder and with the other end on a movable lens mount.

The folding results in a summing effect of the length differences between the two links of each link pair caused by the temperature change.

This allows a length change equal to the difference resulting from the total length of all of the links of the first type minus the total length of all of the links of the second type.

A drawback of this approach is the amount of assembly work needed and the risk of a tilting of the lens due to tolerances between the individual link assemblies. Consequently, the lens or the optical element has to be held by a separate axial guide means. The achievable compensation distance is limited by the number of elements that can be placed along the circumference, that is to say, by the effective diameter of the arrangement. A further increase in the compensation distance per Kelvin (K) of temperature change can only be achieved with links having a greater length. This requires a considerable amount of space. The utilization of the available installation space is unfavorable. The use of link assemblies causes the arrangement to have a low level of stiffness in the lengthwise direction since the individual links bend under axial load. The give adds up with every link. A variable position of the optical system in space can be expected to be associated with a greater imprecision of the axial position of the lens. The lower intrinsic frequency in the lengthwise direction caused by the reduced stiffness is likewise disadvantageous.

SUMMARY

In an embodiment, the present invention provides a device for the temperature-dependent axial movement of an optical component including a monolithic mounting unit having an outer mounting part forming a fixed holder having an axis and an inner mounting part forming a mount adapted to support the optical component. The mount is movable along the axis. A moving mechanism is connected to the fixed holder and the movable mount. The moving mechanism includes at least one external expansion element including a first material having a first coefficient of thermal expansion and at least one internal expansion element including a second material having a second coefficient of thermal expansion, where the first coefficient of thermal expansion is larger than the second coefficient of thermal expansion. A plurality of connecting links are disposed in a star-shaped formation and join a respective one of the at least one external expansion element to a respective one of the at least one internal expansion element. Each group of connecting links is disposed at a prescribed pitch angle with respect to the axis that differs from 90°.

BRIEF DESCRIPTION OF THE DRAWINGS

The device will be explained in greater detail below by way of an example and with reference to the drawings, in which.

DETAILED DESCRIPTION

In an embodiment the invention provides a device for the temperature-dependent, tilt-free axial movement of an optical component with respect to a fixed holder.

The device according to the invention for the temperature-dependent axial movement of an optical component comprises a fixed holder having an axis A along which a mount that supports the optical component can be moved. The fixed holder and the movable mount are joined to each other by a moving mechanism including parts having dissimilar coefficients of thermal expansion. In an embodiment, the device is easy to assemble and conducive for short optical systems, particularly those that are operated with EUV radiation. In this context, the device may attain compensation coefficients in the order of magnitude of approximately 10 μm/K with a small installation space, for instance, an outer diameter of 70 mm and a length of 20 mm.

According to an embodiment of the invention, a monolithic mounting unit is present having an outer mounting part that constitutes the fixed holder and having an inner mounting part that forms the mount for the optical component.

The parts of the moving mechanism encompass at least one external expansion element made of a material having a relatively high coefficient of thermal expansion as well as at least one internal expansion element made of a material having a relatively low coefficient of thermal expansion.

In each case, one external expansion element and one internal expansion element are joined to each other using a number of connecting links arranged in a star-shaped formation, and the connecting links are arranged at a prescribed pitch angle that is not 90° with respect to the axis A.

Figure 1:
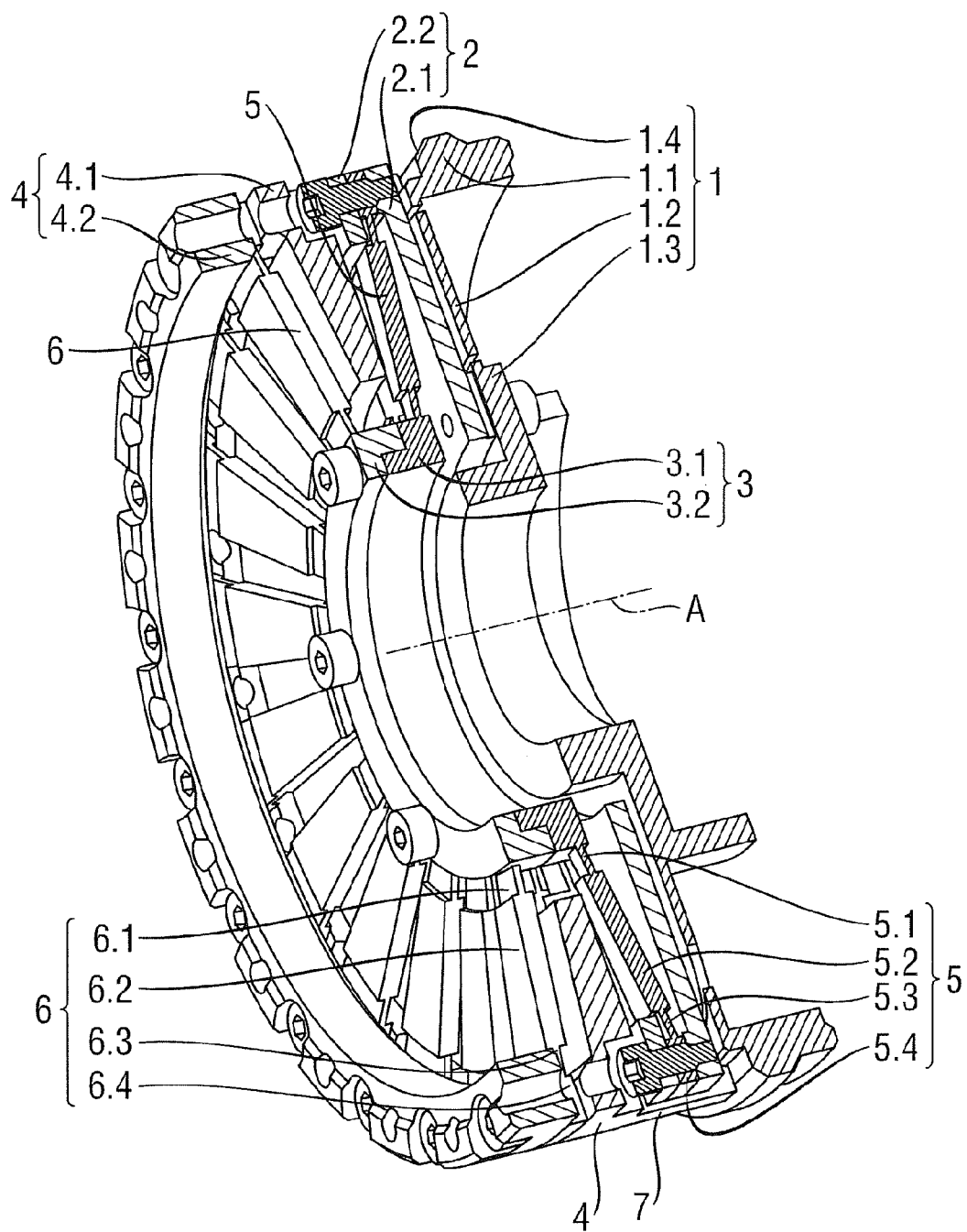
FIG. 1 is a perspective sectional view of a device in accordance with an embodiment of the invention.
Figure 2:
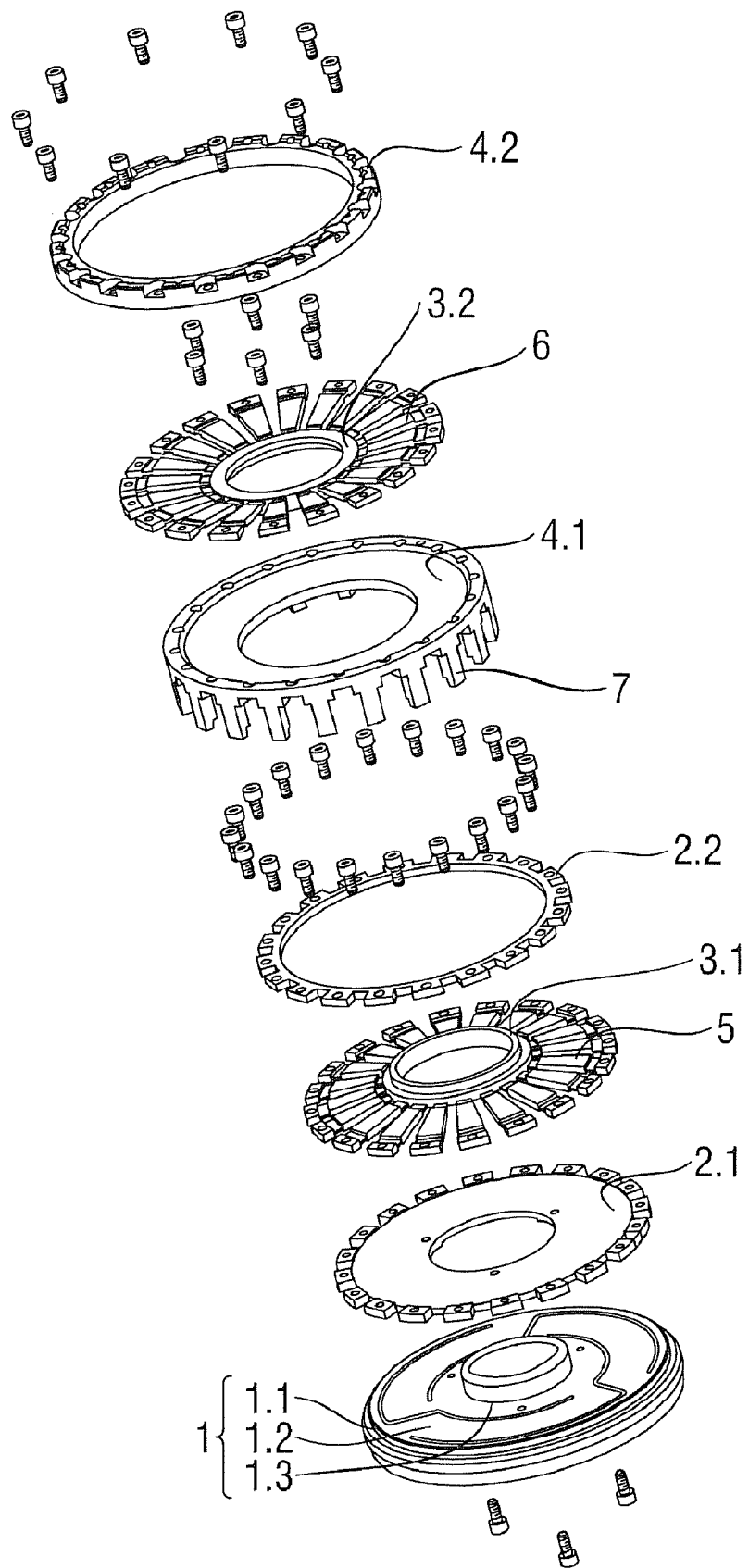
FIG. 2 is an exploded view of the device of FIG. 1.

The device shown in FIGS. 1 and 2 consists essentially of parts arranged on a shared axis A, namely, a mounting unit 1, a first and second external expansion element 2, 4, an internal expansion element 3, a number of first and second connection links 5, 6 as well as a spacer element 7. The material for the expansion elements 2, 3, 4 is selected in such a way that the coefficient of thermal expansion of the first and second external expansion elements 2, 4 is large in comparison to the coefficient of thermal expansion of the internal expansion element 3, resulting in a radial expansion differential.

Advantageously, brass, steel or aluminum are employed for the first and second external expansion elements 2, 4, and Invar is used for the internal expansion element 3.

The material of the mounting unit 1 has the same coefficient of thermal expansion as that of the material of the external expansion elements 2, 4, and preferably, it is made of the same material.

The mounting unit 1 is a slotted monolithic part that, delimited by slits, is divided into an outer mounting part 1.1, an inner mounting part 1.3 and connecting parts 1.2 formed radially between the slits. The outer mounting part 1.1 constitutes a fixed holder, in other words, the mounting unit 1 is joined, for instance, to the housing 9 of an optical system (not shown here) by means of the outer mounting part 1.1. Relative thereto, an axial movement of the inner mounting part 1.3—which serves as the mount for an optical component 8 (not shown here)—is possible. Solid joints 5.1, 5.3 or 6.1, 6.3 form the transition between the outer mounting part 1.1 and the connecting parts 1.2 as well as between the connecting parts 1.2 and the inner mounting part 1.3, which is why an axial movement of the inner mounting part 1.3 with respect to the outer mounting part 1.1 takes place friction-free and without a stick-slip effect.

FIG. 2 shows that the outer and inner mounting parts 1.1, 1.3 of the mounting unit 1 are joined to each other by three connecting parts 1.2 that are each delimited by slits.

The depicted slit layout is only intended as an example of a conceivable configuration and should not be construed as restricting the invention to this.

Instead of being held by just one mounting unit 1, the optical component 8 could also be held by two mounting units 1 arranged axially one after the other, which reliably rules out the possibility of tilting and thus improves the guiding properties.

The constructive configuration of the connecting parts 1.2 ensures that the inner mounting part 1.3 and thus the optical component 8 inserted into it cannot move radially with respect to the axis A, although an axial movement along the axis A is possible. If only one mounting unit 1 is used, the requisite guidance to prevent tilting is brought about by a high radial stiffness of the connecting links 5, 6 that join the expansion elements 2, 3, 4 to each other.

The axis A is the mechanical axis of the mounting unit 1 with respect to which all of the downstream parts are arranged in such a manner that their mechanical axes coincide with the axis A.

The optical component 8 is inserted into the inner mounting part 1.3 in such a way that its optical axis coincides with the axis A.

All of the parts of the device that are present in addition to the mounting unit 1 jointly form a mechanism joining the outer and the inner mounting parts 1.1, 1.3 of the mounting unit 1 to each other, and, also brings about an axial movement as a function of temperature changes and is referred to hereinafter as the moving mechanism.

The function of the moving mechanism relies on the connecting links 5, 6 being joined by their inner ends to the internal expansion element 3, while they are joined by their outer ends 5.4, 6.4 to the first and second external expansion elements 2, 4. For purposes of effectuating a radial movement of the expansion elements 2, 3, 4 with respect to each other, the connecting links have two radially stiff joints which, according to the embodiment of FIG. 1, are configured as solid joints 5.1, 5.3, 6.1, 6.3.

Figure 3:
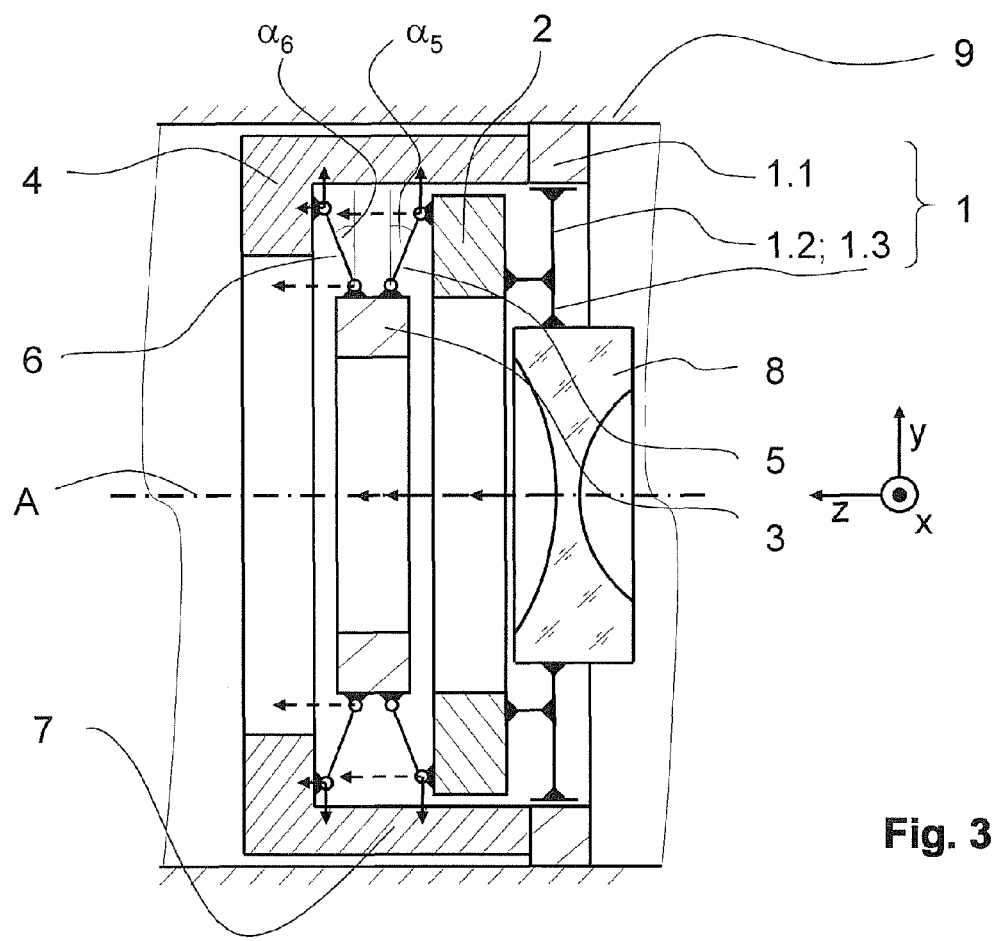
FIG. 3 function diagram showing the device of FIG. 1.

For the sake of the clarity of the mode of operation of the device, FIG. 3 shows a function diagram of the first embodiment. The function drawings depicted in FIG. 3 are designated by the same reference numerals as the associated part depictions in FIGS. 1 and 2.

As already explained, the mounting unit 1 is firmly joined by its inner mounting part 1.3 to an optical component 8 and by its outer mounting part 1.1 to a housing 9 of an optical system. The inner and outer mounting parts 1.3, 1.1 are joined to each other by means of connecting parts 1.2 that allow a limited axial movement of the two mounting parts 1.1, 1.3 towards each other in the direction of the axis A.

In terms of its functioning principle, the moving mechanism—which is connected by one free end to the inner mounting part 1.3 and by the other end to the outer mounting part 1.1—consists of a lever gear formed by three expansion elements 2, 3, 4 that are joined to each other by a plurality of identical double-swing arms, each made up of first and second connecting links 5, 6. In this context, the first connecting links 5 enclose a positive pitch angle $\alpha_5$, while the second connecting links 6 enclose a negative pitch angle $\alpha_6$ with a vertical plane relative to the axis A.

In conjunction with a star-shaped, radial-symmetrical arrangement of a plurality of such double-swing arms, the pitch angles $\alpha_5$, $\alpha_6$ cause the radial expansion differentials to be converted into an axial movement. Radial forces of opposite double-swing arms consistently cancel each other out.

The internal expansion element 3 consists of two parts, namely, a first inner ring 3.1 and a second inner ring 3.2 firmly joined to the former, whereby the first inner ring 3.1, together with the first connecting links 5, and the second inner ring 3.2, together with the second connecting links 6, are each configured as a monolithic part.

The internal expansion element 3 could also consist of a single part with all of the connecting links 5, 6 as a monolithic part, which however, would be more difficult to manage from the standpoint of the manufacturing technology.

The monolithic configuration means that the connecting links 5, 6 and the internal expansion element 3 are made of one and same the material.

The connecting links 5, 6 are each formed by an inner solid joint 5.1, 6.1, a strut 5.2, 6.2, an outer solid joint 5.3, 6.3 as well as an outer end 5.4, 6.4.

The first external expansion element 2 is formed by a first and a second outer ring 2.1, 2.2, while the second external expansion element 4 is formed by a third and a fourth outer ring 4.1, 4.2, each of which clamps the outer ends 5.4 and 6.4 between the outer rings 2.1 and 2.2, and 4.1, 4.2, respectively, thus creating a firm connection between the connecting links 5, 6 and the first or second external expansion element 2, 4. This clamping is advantageously done by means of screwed connections. Due to the minimal contact surfaces, these connections also exhibit only small differences in their radial expansions, thus avoiding stresses that arise from the dissimilar materials when the temperature changes.

On the outer circumference of the second external expansion element 4, there is a spacer element 7 that is expanded in the axial direction and that lies against the collar 1.4 formed for this purpose on the outer mounting part 1.1 of the mounting unit 1. As a result, the outer ends 6.4 of the second connecting links 6 are axially and firmly joined to the external fixed mounting part 1.1. Therefore, when added together, all of the axial movements of the individual parts of the moving mechanism, namely, the first external expansion element 2, the first connecting links 5, the internal expansion element 3 and the second connecting links 6 cause a movement of the inner mounting part 1.3 towards the outer mounting part 1.1

The first and second external expansion elements 2, 4 are configured so as to be ring-shaped and so as to have a large radial ring width that is limited towards the inside by requisite free openings for the internal expansion element 3 or for a beam path through the optical component 8. This results in a large radial stiffness of the external expansion elements 2, 4.

The two external expansion elements 2, 4 are made of the same or of a different material having a high coefficient of thermal expansion, preferably greater than $1\times10^{-5}$ K$^{-1}$, for instance, brass or aluminum.

The internal expansion element 3 is made of a material having a lower coefficient of thermal expansion, preferably of Invar at $2\times10^{-6}$ K$^{-1}$. In this context, the difference of the coefficients of thermal expansion of the first and second external expansion elements 2, 4 in comparison to the coefficients of thermal expansion of the internal expansion element 3 is decisive, and it should be as large as possible.

When the temperature rises, the first and second external expansion elements 2, 4 expand radially to a considerably greater extent than the internal expansion element 3 with the first and second connecting links 5, 6.

This leads to a difference in the diameter of the parts that are joined to each other at the connecting points between the first external expansion element 2 and the outer ends 5.4 of the first connecting links 5, or between the second external expansion element 4 and the outer ends 6.4 of the second connecting links 6, respectively.

If the connecting links 5, 6 were arranged parallel to each other, that is to say, if the pitch angles $\alpha_5$, $\alpha_6$ were equal to zero, this would cause considerable tensile stresses if the temperature were to rise, without an axial movement taking place in this process. However, since the connecting links 5, 6 are slanted relative to each other by a pitch angle $\alpha_5$, $\alpha_6$, the radial expansion difference is compensated for by a change in these pitch angles $\alpha_5$, $\alpha_6$. The change in the pitch angles $\alpha_5$, $\alpha_6$ gives rise to an axial movement of all of the parts of the moving mechanism that are joined merely indirectly to the second external expansion element 4. At the same time, the pitch angles $\alpha_5$, $\alpha_6$ cause the distance of the radial expansion difference to be converted into a considerably larger axial movement.

Figure 4:
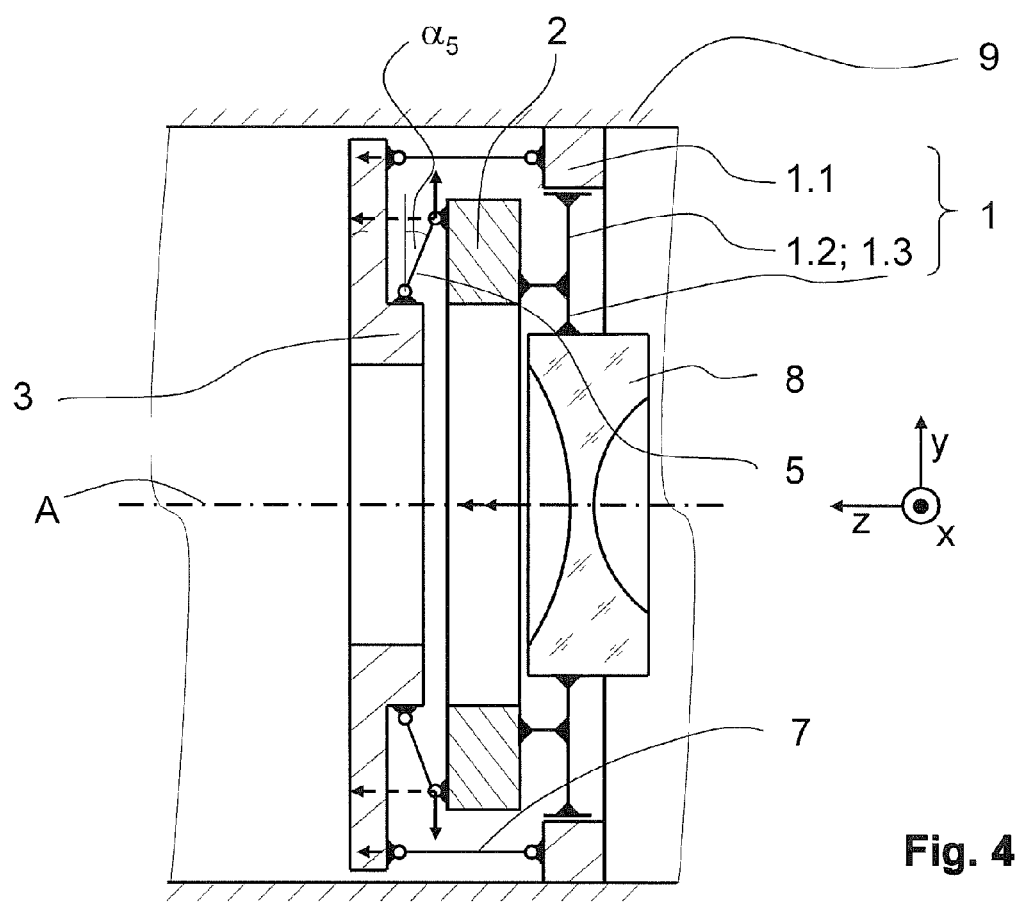
FIG. 4 is a function diagram showing in accordance with another embodiment of the invention.

The effective expansions are indicated in FIGS. 3 and 4 by arrows drawn with a solid line. These expansions bring about movements whose directions are indicated by arrows drawn with a broken line.

The described device can achieve a very large conversion ratio between the radial expansion and the axial movement at very small pitch angles $\alpha_5$, $\alpha_6$, whereas larger pitch angles $\alpha_5$, $\alpha_6$ result in a markedly smaller conversion ratio. At a pitch angle of 45°, the conversion is a mere 1:1.

Assuming that the axial expansion is very small in relation to the length of the connecting links 5, 6, it can be assumed that the conversion ratio over the movement distance will be approximately constant and correspond to the co-tangent of the pitch angle in question.

The pitch angles $\alpha_5$, $\alpha_6$ are typically between about 5° to about 20°, depending on the desired conversion ratio.

Depending on the temperature range for which the device should compensate for the thermal effects on the optical component 8, and depending on the effect of the optical component 8 in an optical system, an axial compensation distance per K of temperature change (compensation coefficient) is prescribed. The desired compensation coefficient is achieved through the dimensioning of the diameter of the expansion elements 2, 3, 4 and through the selection of their coefficients of expansion as well as of the pitch angles $\alpha_5$, $\alpha_6$. The arrangement of the moving mechanism before or after the mounting unit 1 in the positive direction of the optical axis that coincides with the axis A makes it possible to establish positive or negative compensation coefficients. The same applies to the pitch angles $\alpha_5$, $\alpha_6$.

With an eye towards keeping the size of the device small in terms of its length and diameter, the dimensioning is preferably undertaken through the selection of the pitch angles $\alpha_5$, $\alpha_6$, whereby the difference between the coefficients of expansion of the internal expansion element 3 and of the first or second external expansion element 2, 4 should be large.

A person skilled in the art should understand that the term expansion refers to a positive expansion that constitutes an enlargement, as well as to a negative expansion that constitutes a reduction in size.

The term expansion as set forth herein refers to a radial or axial expansion that brings about a movement that is not negligible.

According to the embodiment shown in FIG. 1, the above-mentioned firm connections inside the device are created using screws, as a result of which the device, in conjunction with the materials used for the other parts, is EUV-suitable (EUV-suitable=suitable for radiation in the extreme ultraviolet range).

The embodiment explained and shown in FIGS. 1, 2 may be designed for the mount of a lens. A person skilled in the art should understand that other forms of optical components, for instance, that of a prism, call for a shape that differs from a circular one, at least in terms of the inner circumference of the mounting unit 1. Likewise, the screwed connections can be replaced by other suitable, detachable or non-detachable connections such as, for example, latching or welded connections.

Other conceivable embodiments of a device according to the invention differ essentially in terms of the number of internal and external expansion elements 2, 3, 4.

FIGS. 3 and 4 are meant to provide explanations, whereby FIG. 3 shows a function diagram of the comprehensively described configuration of the device according to the embodiment of FIG. 1, while FIG. 4 shows a function diagram of another embodiment in which the moving mechanism includes only one external expansion element 2 and one internal expansion element 3.

The first part of a moving mechanism—irrespective of the number of expansion elements 2, 3, 4—which also constitutes a first free end of the moving mechanism, may be formed by a first external expansion element 2 that is preferably made of the same material as the mounting unit 1, so that no expansion differentials can occur on the same radius. In this manner, the first part and the mounting unit 1 can be rigidly joined to each other (FIG. 1 and FIG. 2).

Especially for the eventuality that the moving mechanism comprises several external expansion elements 2, 4 and if the last part, which also constitutes a second free end of the moving mechanism, is an external expansion element 4, it is advantageously made of the same material as the mounting unit 1, so that a stress-free firm connection can be established between the last part and the mounting unit 1 (FIG. 3).

According to the embodiment shown in FIG. 4, the last part can also be an internal expansion element 3. In this case, the last part is joined to the mounting unit 1 using a radially movable connection so as to absorb radial stresses.

For embodiments with additional external and internal expansion elements 2, 3, 4, these are joined to each other in a cascade-like arrangement, analogously to the two embodiments shown. Such configurations can be of interest, for instance, when a greater movement distance is to be achieved.

The embodiments presented show devices in which the parts of the moving mechanism and also of the mounting unit 1 are rotation-symmetrical, which has proven to be particularly advantageous when the optical component 8 is rotation-symmetrical, as is usually the case, for example, with a lens.

The parts of the moving mechanism and/or of the mounting unit 1 can also, for instance, be in the form of an axis-symmetrical, equilateral polygon.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS USED

1 mounting unit
1.1 outer mounting part
1.2 connecting part
1.3 inner mounting part
1.4 collar
2 first external expansion element
2.1 first outer ring
2.2 second outer ring
3 internal expansion element
3.1 first inner ring
3.2 second inner ring
4 second external expansion element
4.1 third outer ring
4.2 fourth outer ring
5 first connecting link
5.1 internal solid joint of a first connecting link
5.2 strut of a first connecting link
5.3 external solid joint of a first connecting link
5.4 outer end of a first connecting link
6 second connecting link
6.1 internal solid joint of a second connecting link
6.2 strut of a second connecting link
6.3 external solid joint of a second connecting link
6.4 outer end of a second connecting link
7 spacer element
8 optical component
9 housing of an optical system
A axis
$\alpha_5$ pitch angle of the first connecting link 5
$\alpha_6$ pitch angle of the second connecting link 6

What is claimed is:

1. A device for the temperature-dependent axial movement of an optical component, the device comprising:
    a monolithic mounting unit including an outer mounting part forming a fixed holder having an axis and an inner mounting part forming a mount adapted to support the optical component, the mount being movable along the axis; and
    a moving mechanism connected to the fixed holder and the movable mount, the moving mechanism including:
        at least one external expansion element including a first material having a first coefficient of thermal expansion,
        at least one internal expansion element including a second material having a second coefficient of thermal expansion, the first coefficient of thermal expansion being larger than the second coefficient of thermal expansion, and
        a plurality of connecting links disposed in a star-shaped formation, each of the connecting links joining a respective one of the at least one external expansion element to a respective one of the at least one internal expansion element, each of the connecting links being disposed at a prescribed pitch angle, with respect to the axis, that differs from 90°.

2. The device recited in claim 1, wherein
the at least one external expansion element includes a first external expansion element joined to the inner mounting part and a second external expansion element joined to the outer mounting part, and
the at least one internal expansion element includes a first internal expansion element connected to the first external expansion element by a first group of the connecting elements and connected to the second external expansion element by a second group of the connecting elements.

3. The device recited in claim 1, wherein each of the at least one internal expansion element and the connecting links include a material having a same coefficient of thermal expansion.

4. The device recited in claim 2, wherein the first internal expansion element and the first and second groups of connecting elements include a material having a same coefficient of thermal expansion.

5. The device recited in claim 3, wherein
the at least one internal expansion element includes a first inner ring and a second inner ring fixedly joined to each other,
the first inner ring and a first group of the connecting links form a first monolithic part, and
the second inner ring and a second group of the connecting links form a second monolithic part.

6. The device recited in claim 4, wherein
the internal expansion element includes a first inner ring and a second inner ring joined to each other,
the first inner ring and the first group of connecting links form a first monolithic part, and
the second inner ring and the second group of connecting links form a second monolithic part.

7. The device recited in claim 3 wherein each of the plurality of connecting links includes an inner solid joint, a strut, an outer solid joint and an outer end.

8. The device recited in claim 7 wherein the at least one external expansion element includes two outer rings, and wherein the outer ends of the connecting links are clamped between the outer rings by a screwed connection.

9. The device recited in claim 1, wherein the second coefficient of thermal expansion and a coefficient of thermal expansion of a material of the connecting links is smaller than $1\times10^{-5}\,K^{-1}$.

10. The device recited in claim 1, wherein the second material includes Invar.

11. The device as recited in claim 1, wherein the first material has a coefficient of thermal expansion greater than $1\times10^{-5}\,K^{-1}$.

12. The device recited in claim 9, wherein the first material includes at least one of brass, steel and aluminum.

13. The device recited in claim 2, wherein the second external expansion element includes a spacer element disposed at an outer circumference thereof, the spacer element extending in a direction of the axis and abutting against a collar of the outer mounting part of the mounting unit so as to join the second external expansion element with the outer mounting part.

14. The device recited in claim 1, wherein the mounting unit includes a material having a coefficient of thermal expansion that is the same as the first coefficient of thermal expansion.

15. The device recited in claim 2, wherein the mounting unit includes a material having a coefficient of thermal expansion that is the same as the first coefficient of thermal expansion.

* * * * *